United States Patent
Kawai et al.

[11] Patent Number: 5,163,740
[45] Date of Patent: Nov. 17, 1992

[54] BICYCLE UNIT HUB

[75] Inventors: Mamoru Kawai; Kiyofumi Furumoto, both of Matsumoto, Japan

[73] Assignee: Sansin Engineering, Inc., Matsumoto, Japan

[21] Appl. No.: 733,460

[22] Filed: Jul. 22, 1991

[51] Int. Cl.[5] ............................................. B60B 27/00
[52] U.S. Cl. .................................. 301/110.5; 192/48.92
[58] Field of Search ...................... 301/105 R, 105 B; 192/48.92, 51, 64

[56] References Cited

U.S. PATENT DOCUMENTS 4,226,317 10/1980 Nagano et al. ........................ 192/64
4,580,670 4/1986 Nagano ................................. 192/64

FOREIGN PATENT DOCUMENTS 1-13605 4/1989 Japan.

Primary Examiner—Russell D. Stormer
Attorney, Agent, or Firm—Marks & Murase

[57] ABSTRACT

A bicycle unit hub incorporates a hub shell rotatably supported on a hub shaft, a core mounted to one end of the hub shell for co-rotation therewith, a sprocket carrier supported around the core to rotate relative thereto only in one direction, and a hollow bolt inserted into the hub shell from the other end thereof. The bolt has a head engageable with an annular step formed on the hub shell. The bolt also has a threaded tip portion for engagement with an internally threaded portion of the core or a nut, so that the hub shell is clamped between the bolt head and the core with resultant fixation of the core.

11 Claims, 4 Drawing Sheets

BICYCLE UNIT HUB

BACKGROUND OF THE INVENTION

1. Field of the Invention

This invention relates generally to hubs for bicycles. More specifically, the present invention relates to improvements in a bicycle unit hub.

2. Description of the Prior Art

As is well known, the rear wheel of a bicycle incorporates a hub which typically comprises a hub shell rotatably supported on a hub shaft by a pair of bearings. The hub shell has a gear mounting portion around one bearing (right-hand bearing) for mounting a freewheel. The freewheel includes an inner ring (core) fixed on the gear mounting portion of the hub shell, and an outer ring (sprocket carrier) arranged around the core via a one-way clutch mechanism to rotate only in one direction relative to the core. The sprocket carrier supports a plurality of diametrically different sprockets in the case of a multiple freewheel.

In the typical rear hub described above, the gear mounting portion must be larger in diameter than the right-hand bearing located in the gear mounting portion, and the sprocket carrier is diametrically larger than the core which, in turn, is diametrically larger than the gear mounting portion. Thus, the applicable minimum diameter for the smallest sprocket supported on the sprocket carrier is correspondingly limited, consequently imposing limitations on the selectable speeds provided by the multiple freewheel.

A unit hub, which is a preassembled unit of a hub and a freewheel, is designed to greatly reduce the applicable minimum diameter for a smallest sprocket. Such a unit hub is increasingly used in various bicycles.

A typical unit hub comprises a hub shell having its left-hand end rotatably supported on a hub shaft via a first bearing, a core mounted to the right-hand end of the hub shell and rotatably supported on the hub shaft via a second bearing, and a sprocket carrier arranged around the core via a one-way clutch mechanism to rotate relative to the core only in one direction. Because the second bearing supports the core instead of directly supporting the hub shell, the gear mounting end (right-hand end) of the hub shell may be greatly reduced in diameter. Thus, the core and sprocket carrier supported on the gear mounting portion can be correspondingly reduced in diameter, thereby enabling a great reduction in the applicable minimum diameter for a smallest sprocket.

In nature, the unit hub is handled as a unit and not intended to be disassembled. Indeed, it may be possible to conduct maintenance, to a certain degree, of the unit hub without disassembly. Thus, in general, the core of the unit hub is irremovably mounted to the hub shell.

In actual use, however, it becomes sometimes necessary to disassemble the unit hub for performing more careful maintenance. In view of such a requirement, Japanese Utility Model Publication No. 1-13605 (Published: Apr. 21, 1989; Inventor: Masashi NAGANO) discloses an improved unit hub which has a general configuration resembling that of the previously described typical unit hub but which enables disassembly when necessary.

Specifically, the improved unit hub disclosed in the above Japanese publication comprises a hub shell rotatably supported on a hub shaft, a core (inner ring) mounted in spline engagement with the right-hand end of the hub shell for co-rotation therewith, and a sprocket carrier (outer ring) arranged around the core via a one-way clutch mechanism to rotate relative to the core only in one direction. The improved unit hub further includes a hollow or cylindrical bolt which is inserted into the hub shell from the right-hand end thereof. The bolt has a threaded tip portion engageable with an internally threaded bore of the hub shell. The bolt further has a head which comes into abutting engagement with the core at a position remote from the hub shell.

When the bolt is tightened up, the core is clamped and fixedly held between the bolt head and the hub shell. The spline engagement between the core and the hub shell enables torque transmission from the core to the hub shell. When the bolt is loosened out of engagement with the threaded bore of the hub shell, the spline engagement allows the core to be removed axially from the hub shell, thereby enabling disassembly for maintenance.

While the improved unit hub enables disassembly of the core from the hub shell, it still has the following problems.

In general, the hub shell is made of a light metal (e.g. aluminum) which is relatively weak. Thus, the threaded bore of the hub shell together with the threaded tip portion of the hollow bolt must have a sufficient axial length to insure an enough clamping force as required for fixedly holding the core even under a large torque. As a result, the bolt must be turned many times for assembly and disassembly of the core relative to the hub shell, which makes it cumbersome for the user to perform maintenance of the unit hub.

Further, the internally threaded portion (bore) of the hub shell must have a sufficient wall thickness to meet strength requirements. Thus, certain limitations are necessarily imposed on the freedom in designing the configuration of the hub shell.

SUMMARY OF THE INVENTION

It is, therefore, an object of the present invention to provide a bicycle unit hub which enables easier removal and re-mounting of a core relative to a hub shell than the prior art unit hub.

Another object of the present invention is to provide a bicycle unit hub wherein a core is reliably fixed to a hub shell.

A further object of the present invention is to provide a bicycle unit hub wherein a hub shell is simultaneously reinforced at the time of mounting a core.

Still another object of the present invention is to provide a bicycle unit hub wherein a hub shell can be designed with a high degree of freedom.

According to the present invention, there is provided a bicycle unit hub comprising: a hub shell rotatably supported on a hub shaft and having an axial bore for insertion of the hub shaft; a core mounted to one end of the hub shell, the core being co-rotatable with the hub shell in assembly but removable axially from the hub shell for disassembly; a sprocket carrier supported around the core for rotation relative thereto only in one direction; and a mounting means for removably holding the core in assembled state relative to the hub shell; wherein the axial bore of the hub shell has a first abutting portion at a position axially spaced from said one end of the hub shell toward the other end thereof; the hub shell further has a second abutting portion at said one end for coming into abutment with the core; and the mounting means comprises a hollow bolt and a complementary threaded portion, the bolt being insertable into the axial bore of the hub shell from said other end, the bolt having a threaded tip portion and a head engageable with the first abutting portion of the hub shell, the complementary threaded portion being located axially outwardly from said one end of the hub shell for engagement with the threaded tip portion of the bolt; whereby the hub shell is clamped between the bolt head and the core for holding the core relative to the hub shell.

The complementary threaded portion may be an internally threaded portion of the core. Alternatively, the complementary threaded portion may be provided by a nut which is located axially outwardly from the core in abutment therewith, and the threaded tip portion of the bolt extends beyond the core for engagement with the nut. In either arrangement, the hub shell which is made of a light metal need not be threaded. Since the core and the nut may be made of a relatively hard and strong metal such as iron, the complementary threaded portion need only extend over a relatively short length, thereby making it unnecessary to turn the hollow bolt or the nut many time for removal and re-mounting of the core relative to the hub shell.

The first abutting portion may be located at said other end of the hub shell, and the hollow bolt extends through the hub shell substantially over the entire length thereof. In this case, the hub shell is reinforced by the bolt against axial bending and torsional deformation.

Alternatively, the first abutting portion may be located at an intermediate portion of the hub shell, and the length of the hollow bolt extends from the thus located abutting portion toward the core (or nut) over a shorter length. Such an arrangement will result in overall weight reduction of the unit hub.

Other objects, features and advantages of the present invention will be fully understood from the following detailed description of the preferred embodiments given with reference to the accompanying drawings.

DETAILED DESCRIPTION OF THE PREFERRED EMBODIMENTS

Figure 1:
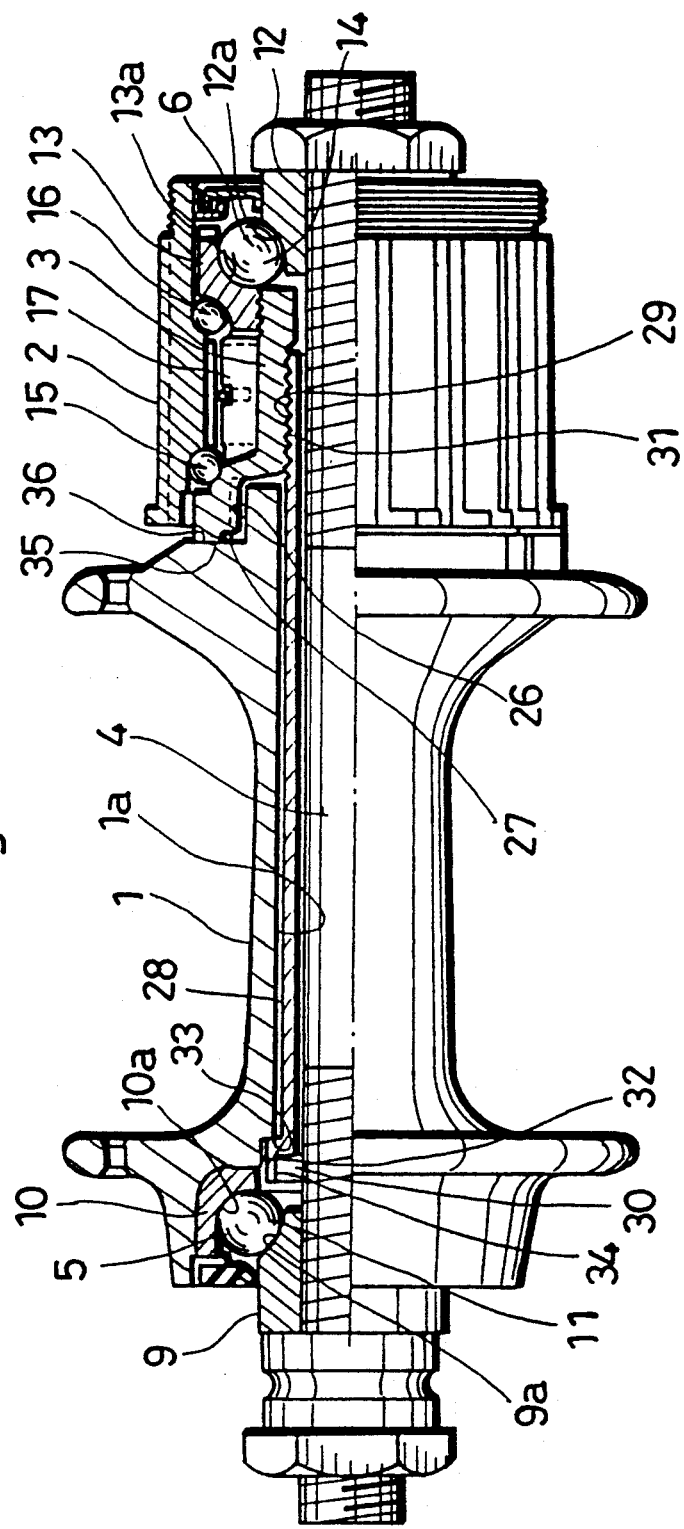
FIG. 1 is a view, partially in section, of a bicycle unit hub according to the present invention as seen from behind the bicycle.

Throughout the accompanying drawings, like parts are designated by the same reference numerals.

Figure 2:
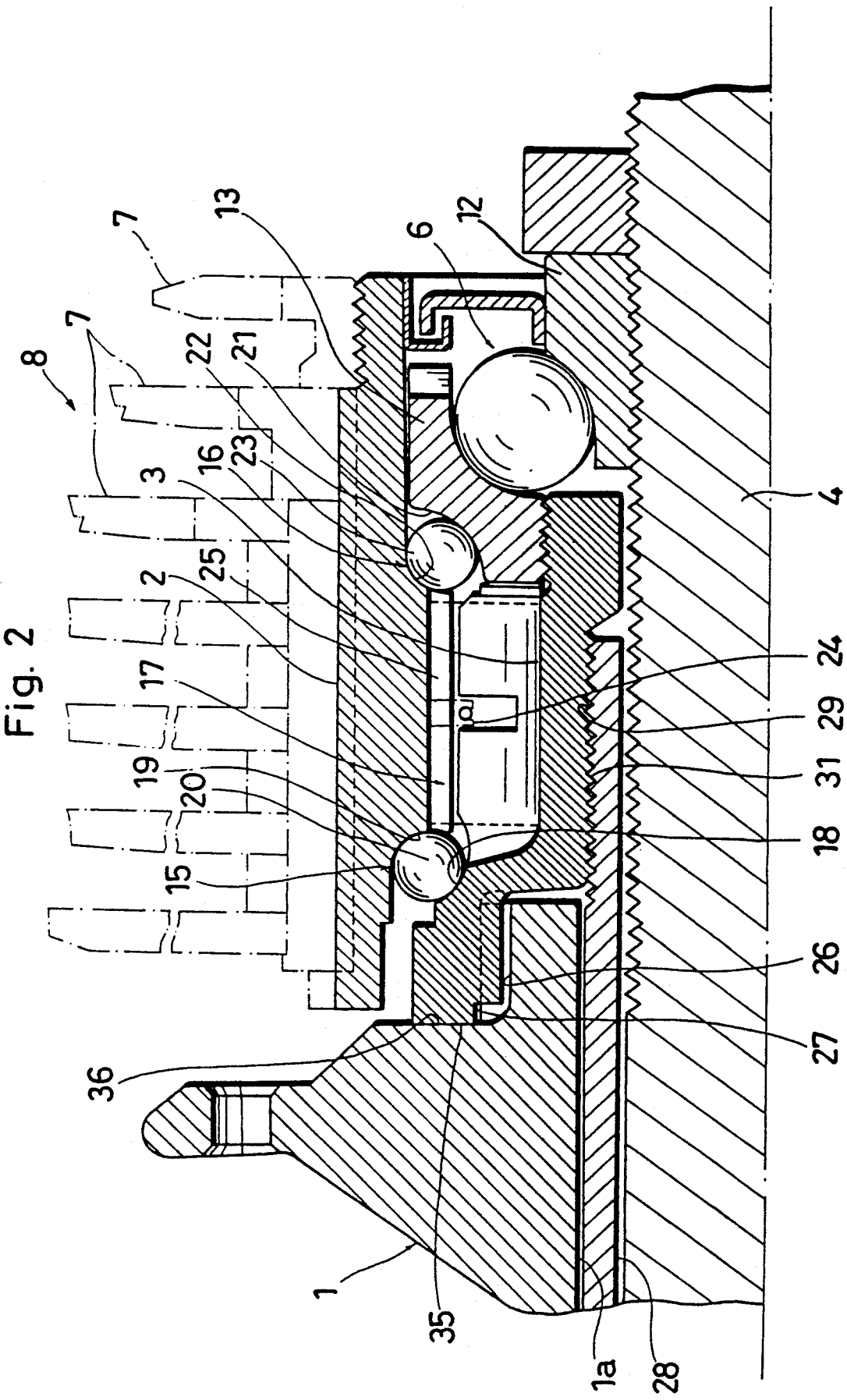
FIG. 2 is an enlarged fragmentary view showing a principal portion of the same unit hub.

Referring first to FIGS. 1 and 2, there is illustrated a unit hub which mainly includes a hub shell 1 having an axial bore 1a, a sprocket carrier (outer ring) 2, a core (inner ring) 3, and a hub shaft 4 extending through the axial bore 1a of the hub shell 1. The sprocket carrier 2 is arranged at the right-hand end of the hub shell 1 (as viewed in the forward running direction of the bicycle) and rotatably supported around the core 3. The hub shell 1 and the core 3 form a combined body which is rotatably supported on the hub shaft 4 by means of first and second bearings 5, 6.

The first bearing 5 is a cup-and-cone type bearing. Specifically, this bearing comprises a first hub cone 9 for providing a first inner race 9a, a first hub cup 10 for providing a first outer race 10a, and a first annular series of balls 11 (only one shown) interposed between the inner and outer races 9a, 10a. The first hub cone 9 is screwed on the left-hand end of the hub shaft 4, whereas the first hub cup 10 is fitted into the left-hand end of the hub shell 1.

Similarly to the first bearing 5, the second bearing 6 is also a cup-and-cone type bearing. Specifically, this second bearing includes a second hub cone 12 for providing a second inner race 12a, a second hub cup 13 for providing a second outer race 13a, and a second annular series of balls 14 (only one shown) interposed between the second inner and outer races 12a, 13a. The second hub cone 12 is screwed on the right-hand end of the hub shaft 4, while the second hub cup 13 is screwed on the core 3.

As shown in FIG. 2, a plurality of diametrically different sprockets 7 are supported on the sprocket carrier 2 for co-rotation therewith. The diametrically different sprockets 7 together with the sprocket carrier 2 provide a multiple sprocket assembly (freewheel or rear gear) 8. Alternatively, the sprocket carrier may support only a single sprocket.

The sprocket carrier 2 is rotatable relative to the core 3 by means of third and fourth bearings 15, 16. However, such rotation is limited only in one direction by means of a one-way clutch mechanism 17.

As better shown in FIG. 2, the third bearing 15 includes a third inner race 18 formed on the core 3, a third outer race 19 formed on the sprocket carrier 2, and a third annular series of balls 20 (only one shown) interposed between the third inner and outer races 18, 19. Likewise, the fourth bearing 16 incorporates a fourth inner race 21 formed on the second hub cup 14, a fourth outer race 22 formed on the sprocket carrier 2, and a fourth annular series of balls 23 (only one shown) interposed between the fourth inner and outer races 21, 22.

The one-way clutch mechanism 17 shown in FIG. 2 is a known ratchet mechanism which includes a ratchet pawl 24 supported on the outer circumference of the core 3, and an annular series of ratchet teeth 25 formed on the inner circumference of the sprocket carrier 2. The ratchet pawl 24 is always spring-biased in a rising direction for engagement with the ratchet teeth 25 but depressibly inclinable against the spring force. Thus, the sprocket carrier 2 is co-rotatable with the core 3 in a forward running direction for torque transmission, but freely rotatable relative to the core in the opposite direction to enable inertial running of the bicycle.

The core 3 is mounted to the right-hand end of the hub shell 1. For this purpose, the right-hand end of the hub shell 1 is provided with an externally splined projection 26, whereas the core 3 has an internally splined inner end 27 for fitting on the externally splined projection 26 of the hub shell. Thus, when assembled, the hub shell is always co-rotatable with the core.

According to the present invention, use is made of a hollow bolt 28 which is inserted into the axial bore 1a of the hub shell 1 from the left-hand end thereof for holding the core 3 relative to the hub shell. The bolt 28 has an externally threaded tip portion 29 and an enlarged head 30. The core 3 has an internally threaded portion 31 for engagement with the threaded tip portion 29 of the bolt.

The bolt head 30 is located in an enlarged bore portion 32 of the hub shell 1. Thus, an annular shoulder or step 33 is formed at the enlarged bore portion 32 to work as a first abutting face for abutment with the bolt head 30. The bolt head may be formed with a polygonal bore 34 for engagement with a tool such as a female wrench which is used for turning the bolt. Alternatively, the bolt head may be otherwise designed for engagement with any turning tool.

The core 3 has an inner end face 35 which comes into abutment with a second abutting face 36 formed at the right-hand end of the hub shell 1. The second abutting face 36 is spaced from the first abutting face 33 (annular shoulder) axially of the hub shaft 4.

In assembly, the threaded tip portion 29 of the hollow bolt 28 is screwed into the internally threaded portion 31 of the core 3, and the hollow bolt 28 is tightened up by turning. As a result, the core 3 and the bolt head 30 approaches each other to clamp the hub shell 1 therebetween. In other words, the portion of the hub shell between the first and second abutting faces 33, 36 is subjected to a clamping force for fixing the core 3 relative to the hub shell.

The core 3 together with the sprocket carrier 2 thereon may be disassembled from the hub shell 1 by reversing the above operation.

With the arrangement described above, the core 3 is made of a relatively hard and strong metal such as iron for transmission of a large torque from the sprocket carrier 2, and the internally threaded portion 31 formed on the core is also strong. Thus, the internally threaded portion 31 need only have a small length, though not necessarily small, for engagement with the externally threaded portion 29 of the hollow bolt 28, but nevertheless provides an enough clamping force as required for holding the core 3 relative to the hub shell 1. As a result, the hollow bolt 28 need not be turned many times, thereby simplifying assembly and disassembly of the core 3 relative to the hub shell 1.

According to the present invention, while the core 3 need be fixed relative to the hub shell 1, it is the hub shell 1, instead of the core itself, that is clamped. Such an arrangement makes a sharp contrast against the prior art (Japanese Utility Model Publication No. 1-13605) wherein it is the core that is clamped. Thus, the uniqueness of the present invention resides in that the core is used as a clamping member (instead of a clamped member), thereby making it unnecessary to provide threads on the hub shell which is made of a relatively light and soft metal.

In the embodiment illustrated in FIGS. 1 and 2, the hollow bolt 28 is made to extend through the hub shell 1 substantially over the entire length thereof. When this arrangement is adopted, the hub shell, which is subjected to a relatively large clamping force between the bolt head 30 and the core 3, is reinforced by the bolt 28 against axial bending and torsional deformation.

Alternatively, the annular shoulder or first abutting face 33 may be located at an intermediate portion (exactly middle, or closer to the right-hand end, or closer to the left-hand end) of the hub shell 1, and the bolt head 30 is made to engage the thus located shoulder. In this case, the hollow bolt can be rendered much shorter than illustrated in FIG. 1, thereby contributing to the overall weight reduction of the unit hub.

Figure 3:
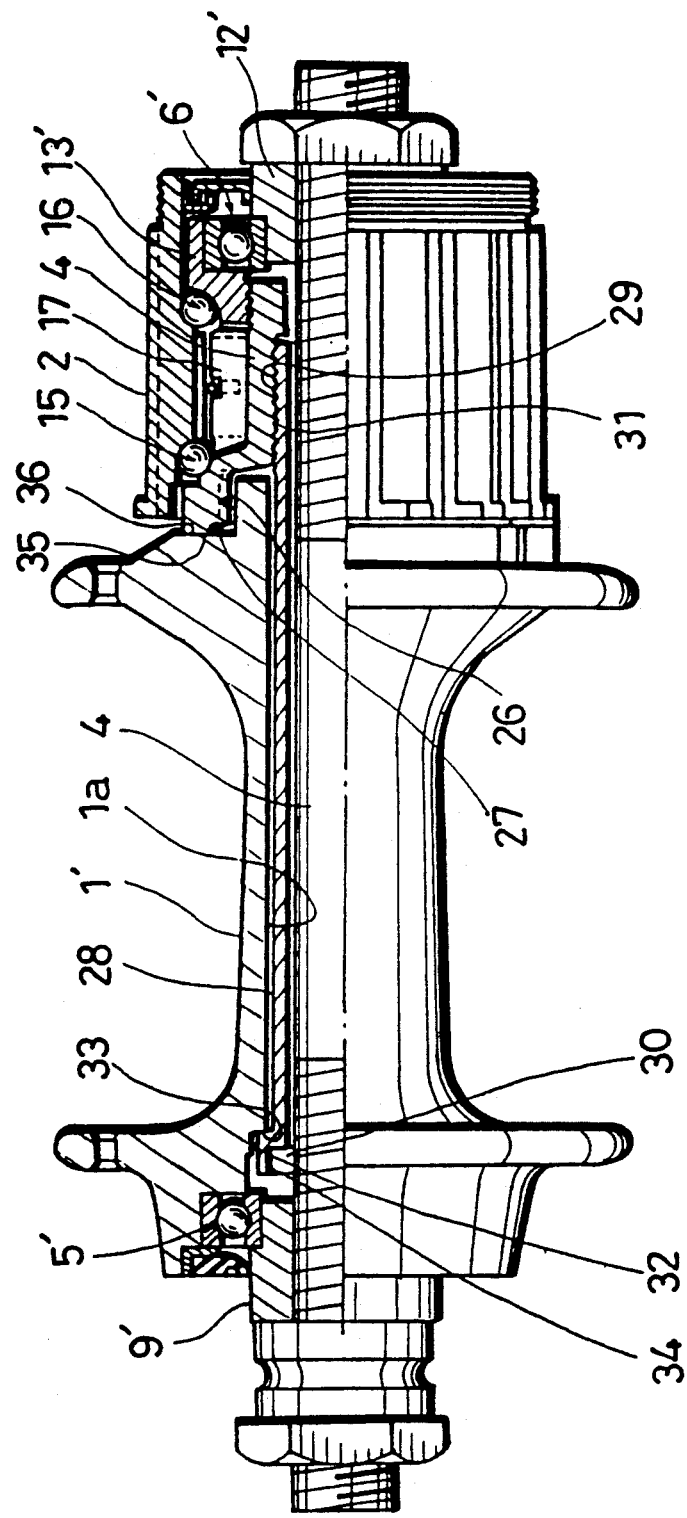
FIG. 3 is a view similar to FIG. 1 but showing another bicycle unit hub according to the present invention.

FIG. 3 shows a modified unit hub according to the present invention. The modified unit hub incorporates first and second bearings 5', 6' each of which is a commercially available radial ball bearing instead of a cup-and-cone type bearing. Obviously, for adaptation to such bearings 5', 6', the modified unit hub incorporates a slightly modified hub shell 1', a first bearing mounter 9' (instead of the first hub cone 9 in FIG. 1), a second bearing mounter 10' (instead of the second hub cone 12 in FIG. 1), and a slightly modified second hub cup 13'. The modified unit hub is otherwise the same as the foregoing embodiment.

Figure 4:
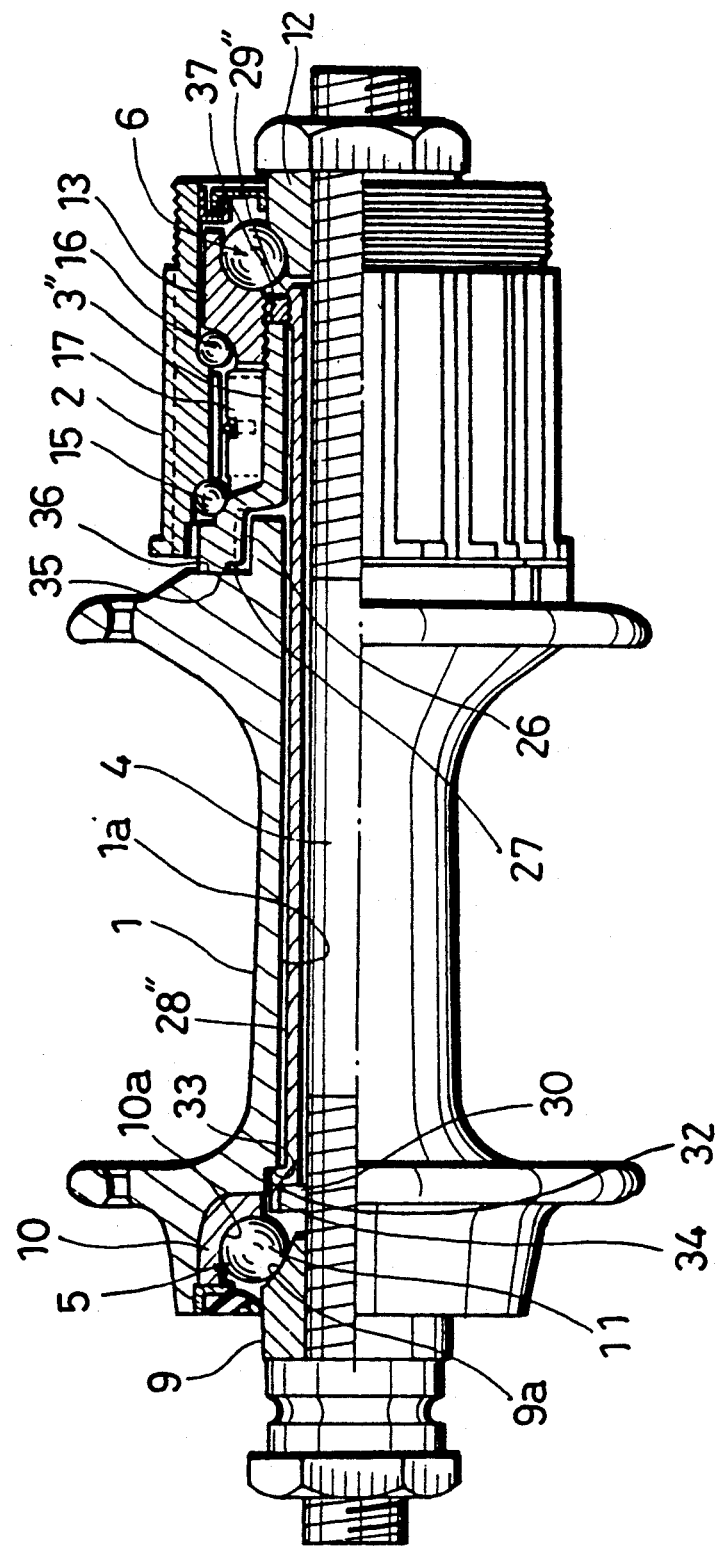
FIG. 4 is a view also similar to FIG. 1 but showing a further bicycle unit hub according to the present invention.

FIG. 4 shows another modified unit hub which differs from that of FIGS. 1 and 2 only in the following respects.

First, the modified unit hub incorporates a core 3" which itself is not formed with an internally threaded portion. Instead, a nut 37 is arranged axially outwardly of the core 3" in abutment with the outer end thereof. Secondly, a hollow bolt 28" is made to have an externally threaded tip portion 29" which extends beyond the core 3" for engagement with the nut 37. The nut 37 may be provided with tool engaging holes (not shown) for facilitating turning of the nut.

In the modification shown in FIG. 4, the hollow bolt 28" itself need not be turned relative to the hub shell 1 because the nut 37 can be turned for tightening the bolt. Thus, the enlarged head 30 of the bolt 28" may be rendered non-circular to be non-rotatably received in the correspondingly non-circular enlarged bore portion 32 of the hub shell 1. Such an arrangement is advantageous in that the torque applied to the core 3" can be transmitted to the hub shell 1 at both ends thereof, thereby preventing or restraining the hub shell from being subjected to a torsional force. Further, the arrangement of FIG. 4 is also advantageous in that the core 3" itself need not be formed with internal threads.

The present invention being thus described, it is obvious that the same may be varied in many ways. For instance, the cup-and-cone type bearing shown for the embodiments of FIGS. 1, 2 and 4 may be replaced by the radial bearing shown in FIG. 3. Such variations are not to be regarded as a departure from the spirit and scope of the invention, and all such modifications as would be obvious to those skilled in the art are intended to be included within the scope of the following claims.

We claim:

1. A bicycle unit hub comprising:
a hub shell rotatably supported on a hub shaft and having a non-threaded axial bore for insertion of the hub shaft;
a core mounted to one end of the hub shell, the core being co-rotatable with the hub shell in assembly but removable axially from the hub shell for disassembly;
a sprocket carrier supported around the core for rotation relative thereto only in one direction; and
a mounting means for removably holding the core in assembled state relative to the hub shell; wherein
the non-threaded axial bore of the hub shell has a first abutting portion at a position axially spaced from said one end of the hub shell toward the other end thereof;
the hub shell further has a second abutting portion at said one end for coming into abutment with the core; and
the mounting means comprises a hollow bolt and a complementary threaded portion, the bolt being insertable into the axial bore of the hub shell from said other end, the bolt having a threaded tip portion and a head engageable with the first abutting portion of the hub shell, the complementary threaded portion being located axially outwardly from said one end of the hub shell for engagement with the threaded tip portion of the bolt; whereby the hub shell is clamped between the bolt head and the core for holding the core relative to the hub shell.

2. The unit hub of claim 1, wherein the complementary threaded portion is an internally threaded portion of the core.

3. The unit hub of claim 1, wherein the complementary threaded portion is provided by a nut which is located axially outwardly from the core in abutment therewith, the threaded tip portion of the bolt extending beyond the core for engagement with the nut.

4. The unit hub of claim 1, wherein the first abutting portion is an annular step.

5. The unit hub of claim 4, wherein the annular step is located at said other end of the hub shell, the bolt extending through the hub shell substantially over the entire length thereof.

6. A bicycle unit hub comprising:

a hub shell rotatably supported on a hub shaft, the hub shell having first and second axial ends and including an axial bore extending through the hub shell to allow insertion of the hub shaft, the axial bore of the hub shell including a first end proximate the first end of the hub shell and a second end proximate the second end of the hub shell, the hub shell including an abutting portion;

a core mounted to the first end of the hub shell, the core being co-rotatable with the hub shell in assembly but removable axially from the hub shell for disassembly;

a sprocket carrier supported around the core for rotation relative thereto only in one direction; and a clamping assembly for removably holding the core in assembled state relative to the hub shell;

the clamping assembly comprising a hollow bolt and a complementary threaded portion, the bolt extending through the hub shell and comprising a head engageable with the abutting portion and a threaded tip portion extending axially outwardly of the first end of the hub shell for engagement with the complementary threaded portion, the bolt and complementary threaded portion being rotatable with the hub shell; whereby the shub shell is clamped between the bolt head and the core for holding the core relative to the hub shell.

7. The unit hub of claim 6, wherein the complementary threaded portion is an internally threaded portion of the core.

8. The unit hub of claim 6, wherein the complementary threaded portion is provided by a nut which is located axially outwardly from the core in abutment therewith, the threaded tip portion of the bolt extending axially beyond the core for engagement with the nut.

9. A bicycle unit hub comprising:

a hub shell rotatably supported on a hub shaft, the hub shell having first and second ends and an axial bore for insertion of the hub shaft, the hub shell including an abutting portion;

a core mounted to the first end of the hub shell, the core being co-rotatable with the hub shell in assembly but removable axially from the hub shell for disassembly;

a sprocket carrier supported around the core for rotation relative thereto only in one direction; and a mounting means for removably holding the core in assembled state relative to the hub shell; wherein the mounting means comprises a hollow bolt and a complementary threaded portion, the bolt having a head at one end and a threaded tip at the other end, the bolt being arranged such that the bolt head is closer to the second end of the hub shell than the threaded tip, the bolt head being engageable with the abutting portion of the hub shell, the complementary threaded portion being adapted for engagement with the threaded tip portion of the bolt; whereby the hub shell is clamped between the bolt head and the core for holding the core relative to the hub shell.

10. The unit hub of claim 9, wherein the complementary threaded portion is an internally threaded portion of the core.

11. The unit hub of claim 9, wherein the complementary threaded portion is provided by a nut which is located axially outwardly from the core in abutment therewith, the threaded tip portion of the bolt extending beyond the core for engagement with the nut.

* * * * *